United States Patent
Yount et al.

(10) Patent No.: US 7,182,296 B2
(45) Date of Patent: Feb. 27, 2007

(54) METHODS AND APPARATUS FOR ERROR-TOLERANT WRAP-BACK ACE MONITOR

(75) Inventors: Larry J. Yount, Scottsdale, AZ (US); Dale D. Davidson, Glendale, AZ (US); William F. Potter, Waddell, AZ (US); Alan B. Hickman, Cave Creek, AZ (US); Willard A. Blevins, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 802 days.

(21) Appl. No.: 10/112,552

(22) Filed: Mar. 28, 2002

(65) Prior Publication Data

US 2006/0214066 A1    Sep. 28, 2006

(51) Int. Cl.
*B64C 13/20*    (2006.01)
(52) U.S. Cl. ........................ 244/194; 244/175
(58) Field of Classification Search ............... 244/175, 244/194, 221, 228
See application file for complete search history.

(56) References Cited

U.S. PATENT DOCUMENTS

| | | | | | |
|---|---|---|---|---|---|
| 4,095,763 | A | * | 6/1978 | Builta | 244/194 |
| 5,493,497 | A | * | 2/1996 | Buus | 701/4 |
| 5,819,188 | A | * | 10/1998 | Vos | 701/4 |

* cited by examiner

*Primary Examiner*—Robert P. Swiatek
(74) *Attorney, Agent, or Firm*—Ingrassia Fisher & Lorenz

(57) ABSTRACT

Methods and apparatus are provided for more reliably transferring operational control for various aircraft flight control surfaces from a first sub-system to a second sub-system. The present invention provides an Actuator Control Electronics (ACE) wrap-back module that monitors the output of the normal mode control module and switches control to the direct control module based upon the detection of an error condition. The switching function is controlled by a monitoring system that monitors the output from an integrated heartbeat module that emits a pre-programmed signal. The pre-programmed signal is encoded and sent over a communication bus where it is then decoded and validated by comparing the decoded signal to the expected results. Any irregularity in the heartbeat signal automatically triggers a change of control from the first flight control sub-system to the second flight control sub-system.

21 Claims, 2 Drawing Sheets

METHODS AND APPARATUS FOR ERROR-TOLERANT WRAP-BACK ACE MONITOR

TECHNICAL FIELD

The present invention relates generally to aircraft flight control systems. More particularly, the present invention relates to actuator control electronics in fly-by-wire flight control systems.

BACKGROUND OF THE INVENTION

Typical flight control systems used in many aircraft rely upon a combination of direct mechanical linkages between the pilot's control devices and the aircraft flight control surfaces. Accordingly, when a pilot manipulates flight control devices such as the pedals, levers, and control column, mechanical linkages transmit the movement of the controls to aircraft flight control surfaces, such as the rudders, ailerons, and elevators. These mechanical linkages move the flight control surfaces appropriately in response to the pilot's actions.

The use of mechanical flight control systems provides several advantages. Not only is the system relatively simple with somewhat predictable failure modes and effects, but it also provides for direct control of the aircraft flight control surfaces. These mechanical flight control systems are also quite reliable, since aircraft manufacturers and operators have had long experience with the implementation, maintenance and repair of mechanical flight control systems. However, mechanical flight control systems generally require detailed inspections to ascertain the continued viability of the mechanical components and are also susceptible to failure due to the ordinary wear and tear associated with the movement of the mechanical parts over an extended period of time.

In conjunction with the advancement of analog and digital circuitry, new aircraft flight control systems have been developed for use in aircraft. Many of these new aircraft flight control systems are not reliant on direct mechanical linkages. These newer aircraft flight control systems use electronic controllers that receive and transmit analog and digital signals to control devices, such as hydraulic actuators, that in turn control the movement of aircraft flight control surfaces. This type of flight control system, known as a "fly-by-wire" system, provides significant advantages over standard mechanically linked flight systems.

The use of highly reliable electronic signals generated in response to pilot manipulation of flight deck controls or autopilot commands, instead of mechanical linkages, provides the possibility of improved overall system reliability and performance. Also, the systems can be easier to maintain since there is less mechanical failure due to worn components to be concerned with.

The fly-by-wire aircraft control system, however, is not failure proof and, like most advances in the art, introduces new failure points for consideration. In some cases, the signals generated by modern control fly-by-wire systems are very complex and some failures of the electronic subsystems may lead to loss of operational control. In addition, the data buses and/or wires interconnecting the control electronics, control actuators and sensors can become damaged or disconnected, thereby destroying or interfering with the pilot's ability to control the aircraft. Accordingly, various types of precautions are taken to guard against system failure. Some of these precautions include the use of redundant circuits and reconfiguration elements that can detect and mitigate failure in the circuits for the fly-by-wire flight control system.

In general, whenever a certain mode of failure for a given electronic subsystem is predictable, then a monitoring and response system can be developed and implemented to detect and mitigate the failure of the subsystem, when it fails according to the predicted mode. There are, however, certain complex subsystem elements for which the failure modes involve common mode design errors that are neither readily predictable nor are the symptoms of failure easily detectable because the failure may actually be part of the monitoring system or the redundancy protection.

For example, when an elevator control is monitored by sensing the motion of the elevator surface, the integrity of the sensor feedback signal is important to detect any undesirable variations in movement to permit failure detection. Likewise, the monitoring response paths that would shutdown or reconfigure the malfunctioning subsystem to mitigate any failure, is also important to the effectiveness of the monitoring system. If the communications path for these elements and subsystems is the same, or of a similar complex design, then the integrity of the monitoring system may be compromised by the same complexity issues as the control function itself. This situation can serve to decrease flight safety margins by decreasing the effectiveness of supposed isolation provided by the redundancy and monitoring of the electronic control systems of the aircraft.

In view of the foregoing, it should be appreciated that it would be desirable to sense and mitigate failures in the aircraft flight control system that may also circumvent the undesirable results of common-mode failures resulting from complexity in the primary control elements. In addition, it would be desirable to provide high reliable yet simple back-up operational flight control elements that can be integrated with the existing complex electronic equipment of the primary flight control system and the aircraft's primary flight control computer, and which would not be susceptible to the same errors as the complex portions of the electronic controls.

BRIEF SUMMARY OF THE INVENTION

Methods and apparatus are provided for transferring operational control for aircraft flight control surfaces from a first flight control sub-system to a second flight control sub-system whenever a change of state in a pre-determined "heartbeat" signal is detected. The present invention comprises an Actuator Control Electronics (ACE) wrap-back monitor module that monitors the output of the normal mode control module and switches control to the direct control module based upon the detection of a predetermined error condition. The switching is controlled by a "heartbeat" monitoring system that monitors the output from an integrated heartbeat module that emits a pre-programmed signal. The heartbeat module acts as a switching mechanism to transfer operational control for the flight controls of the aircraft. The pre-programmed signal is enabled by the wrap-back monitor module, is encoded and sent over a communication bus where it is then decoded and validated by the heartbeat monitoring system. The heartbeat monitoring system compares the decoded signal to the expected results. Any irregularity in the system response, change of state in the heartbeat signal, or interruption of the heartbeat signal, triggers a change of control from a first flight control sub-system to a second flight control sub-system.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

Figure 1:
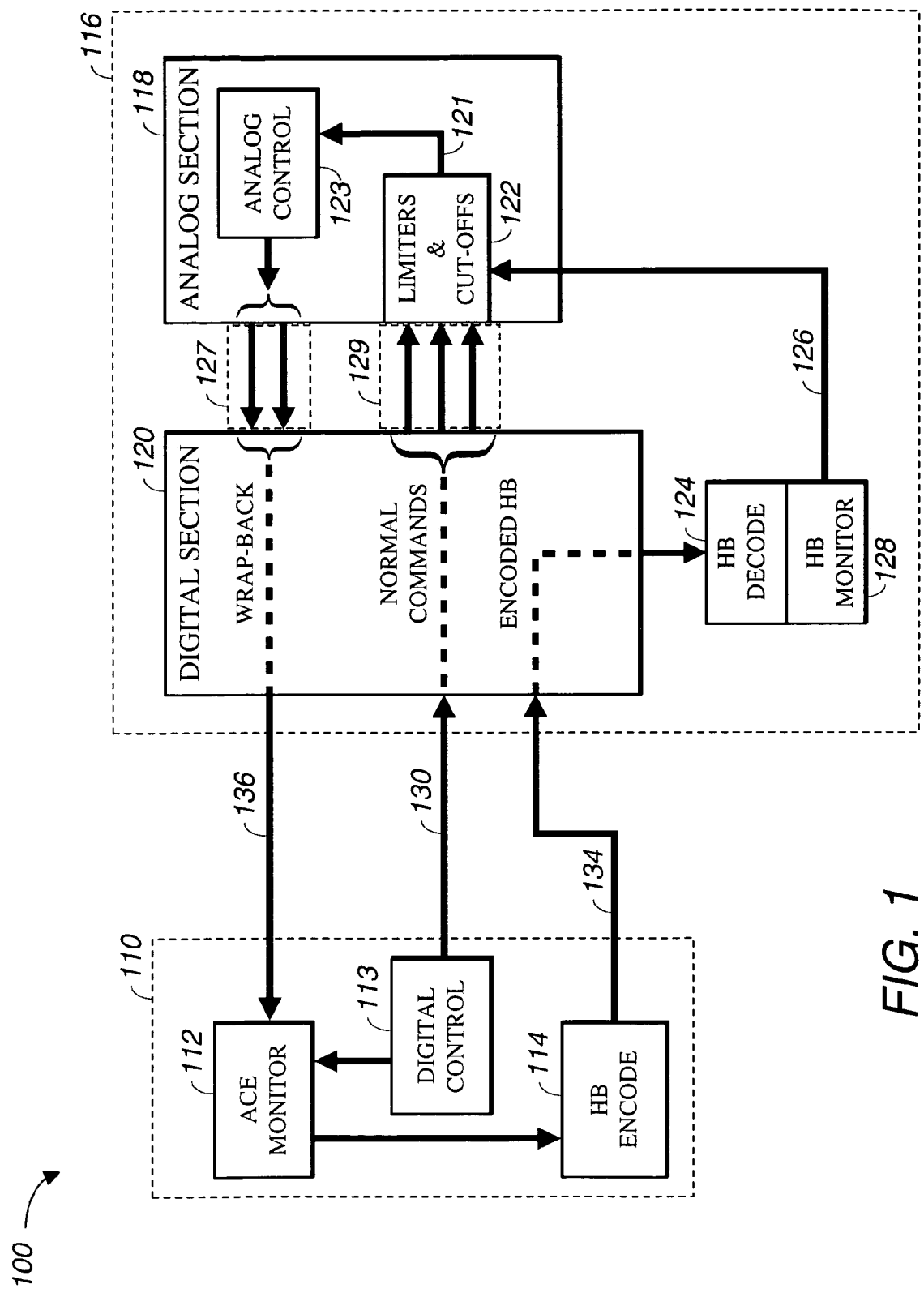
FIG. 1 is a block diagram of an ACE wrap-back module according to an exemplary embodiment of the present invention.

Referring now to FIG. 1, an ACE monitoring and feedback system 100 according to a preferred embodiment of the present invention comprises a Flight Control Module (FCM) 110, an Actuator Control Electronics (ACE) module 116, an FCM control bus 130, a heartbeat (HB) encode bus 134, and a feedback bus 136.

ACE module 116 comprises an ACE analog section 118, an ACE digital section 120, an analog command bus 121, a limiters and cut-off module 122, an analog control module 123, a heartbeat decode module 124, a heartbeat (HB) monitor bus 126, a heartbeat monitor 128, wrap-back bus 127 and a command bus 129. ACE analog section 118 and ACE digital section 120 are separate flight control subsystems that can operate independently to control the various flight control surfaces of an aircraft in response to a pilot's commands.

Analog control module 123 receives input from the various aircraft actuator sensors and from various other sources such as the pilot's control column. In normal mode operation, analog control module also receives and processes commands from digital control module 113 and limiters and cut-offs module 122 via analog command bus 121. In response to these various inputs, analog control module 123 provides signals to the flight control surface actuators.

FCM 110 comprises an ACE monitor 112, a digital control module 113, and a heartbeat encode module 114. Heartbeat encode module 114 generates a heartbeat signal which is transmitted to heartbeat decode module 124 via heartbeat bus 134. The heartbeat signal may be comprised of a single signal or multiple independent signals, it may be a simple or complex signal, but in the most preferred embodiments of the present invention, the heartbeat signal is a byte of data transmitted in a serial fashion. The heartbeat signal may be a single number repeated over and over again, or, more preferably, a series of progressive numbers that is repeated according to a pre-determined pattern. If ACE monitor 112 detects any abnormal or unexpected results from wrap-back bus 136, ACE monitor 112 will disable all or a portion of heartbeat encode module 114.

Once disabled, heartbeat encode module 114 will cease to send all or a portion of the heartbeat signal to heartbeat decode module 124. In turn, HB monitor 128 will disable the signals transmitted from digital control module 113 via command bus 129 and also disable the signals from limiters and cut-off module 122 by sending a signal via HB monitor bus 126. Accordingly, any unexpected change in the change of state of the heartbeat signal will trigger transfer of control for one or more flight control surfaces to analog control module 123, which will control the flight control surfaces without regard to the inputs received from digital control module 113 or limiters and cut-offs module 122. The change of state for the heartbeat signal could be the absence of the heartbeat signal or, alternatively, an unexpected code being transmitted as the heartbeat signal.

Regardless of the cause, once the expected heartbeat signal fails to be received by heartbeat decode module 124, heartbeat monitor module 128 will act as a transfer control mechanism and cause limiters and cut-offs module 122 to switch all or a portion of ACE 116 control functions from ACE digital section 120 to ACE analog section 118. This allows the selected aircraft flight control surfaces to be controlled exclusively by ACE analog section 118 and to ignore commands received from ACE digital section 120.

Figure 2:
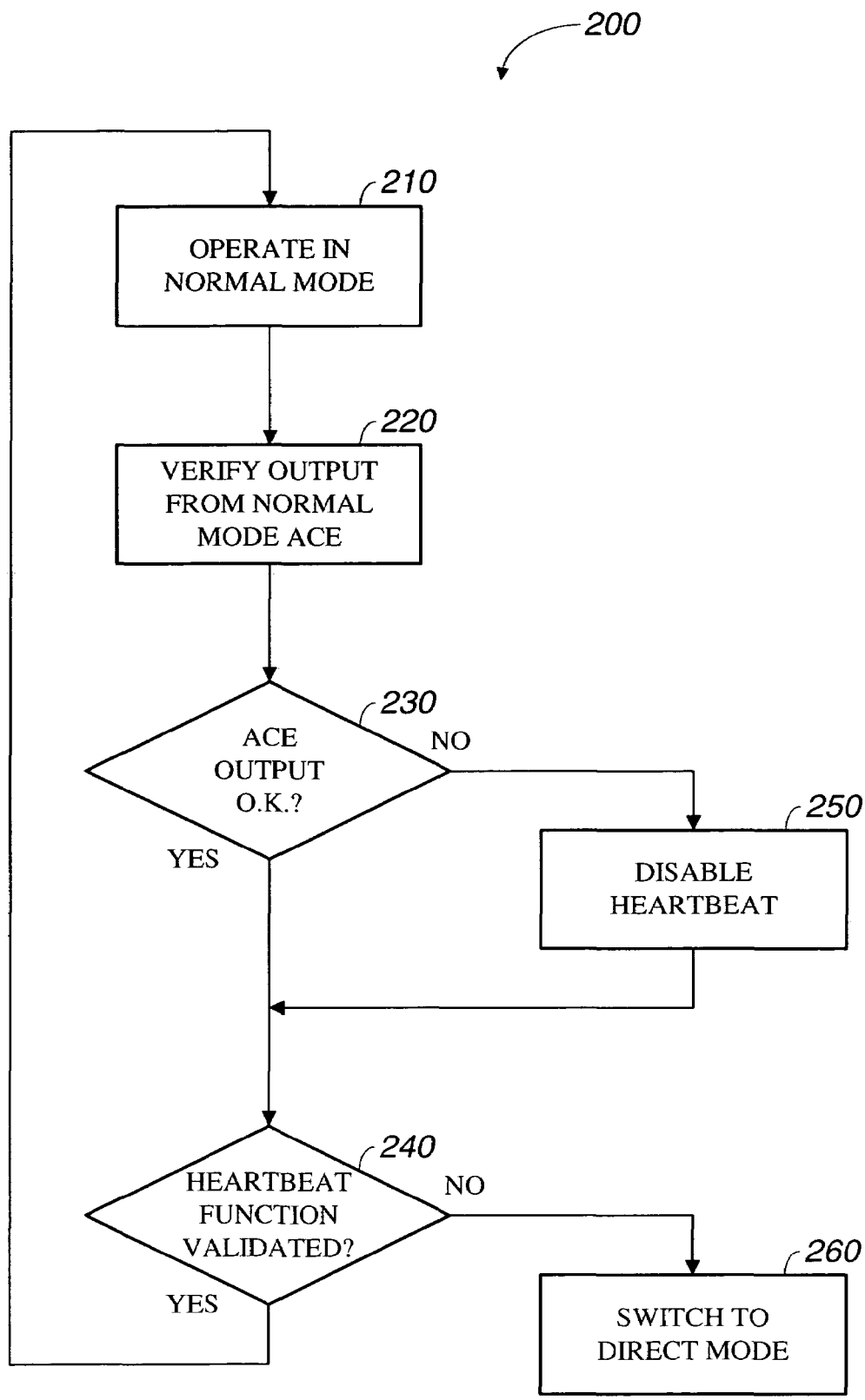
FIG. 2 is a flow chart depicting the logical operation of an ACE wrap-back module according to an exemplary embodiment of the present invention.

Referring now to FIGS. 1 and 2, a process 200 for controlling an ACE monitoring and feedback system 100 according to a preferred embodiment of the present invention is shown. Under normal operating conditions, ACE monitoring and feedback system 100 allows ACE digital section 120 to control the aircraft flight control surfaces based on commands received from digital control module 113 sent via FCM command communication bus 130 (step 210). ACE monitor 112 monitors the output from ACE analog section 118 as transmitted by ACE feedback bus 136 to verify that the output from ACE module 116 is correctly following the commands of digital control module 113 and that the operational output is within the expected parameters (step 220). The expectations for the output of ACE module 116 are based on a pre-programmed understanding of the variance between the input to ACE module 116 and the wrap-back output received by ACE monitor 112 from the output of ACE module 116, which is sent to ACE monitor 112 via feedback bus 136.

Provided that the output from ACE digital section 120 is operating within the expected parameters, then the heartbeat function will continue to be provided by heartbeat encode module 114 (step 240) and the ACE monitoring and feedback system will continue to operate in normal mode (step 210).

However, if there are any unexpected results in the output of ACE analog section 116, then ACE monitoring and feedback system 100 will disable all or a portion of the heartbeat signal by shutting down all or a portion of heartbeat encode module 114 (step 250). Once heartbeat encode module 114 has been disabled, ACE feedback and monitoring system 100 will transfer control of the selected aircraft flight control surfaces to analog control module 123 of ACE analog section 118 (step 260). This occurs when heartbeat monitor module 128 detects that all or a portion of the heartbeat signal is no longer being received by heartbeat decode module 124.

It should also be noted that in the event of any failure of any component used in ACE monitoring and feedback system 100 that would prevent the heartbeat signal from successfully reaching heartbeat monitor 128, control of the aircraft flight control systems would be switched to the analog subsystem, regardless of the reason for the failure. This means that a failure of Flight Control Module 110 or any of its subsystems that will disable the heartbeat signal provided by heartbeat encode module 114 will result in a transfer of control from ACE digital section 120 to ACE analog section 118. Similarly, any failure in bus 134 that transmits the heartbeat signal generated by heartbeat encode module 114 will also result in the transfer of control from ACE digital section 120 to ACE analog section 118. In the most preferred embodiments of the present invention, FCM control bus 130, HB encode bus 134, and feedback bus 136 are part of a bi-directional data bus.

In this manner, ACE monitoring and feedback system 100 provides methods and apparatus for switching control of the aircraft flight control surfaces from one sub-system to another. The seamless switching of the controls for flight control surfaces from the normal mode to the direct mode enhances the safety and operational stability of the aircraft. The simplicity of the heartbeat module signal allows the system to switch control from a first sub-system to a second sub-system in an easily monitored environment. This allows the system to provide a relatively fail-safe switching system for fly-by-wire systems that is far less prone to logic errors, voltage spikes, etc. It should be noted that the present invention might be used to switch the control mechanism for all flight control surfaces or for only a selected portion of the flight control surfaces, depending on the design of the system. Additionally, multiple independent heartbeat encoder/decoder circuits could be utilized to further compartmentalize the failure conditions and resulting operational control issues.

From the foregoing detailed description of the preferred exemplary embodiments, it should be appreciated that apparatus and methods are provided for enhanced backup flight control systems for fly-by-wire aircraft control systems. While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the detailed description provided herein will provide those skilled in the art with a convenient road map for implementing a preferred embodiment of the invention. It should be understood that various changes may be made in the function and arrangement of elements described in an exemplary preferred embodiment without departing from the spirit and scope of the invention as set forth in the appended claims.

What is claimed is:

1. An apparatus comprising:
   at least one flight control surface;
   a first flight control sub-system connected to said at least one flight control surface;
   a second flight control sub-system connected to said at least one flight control surface;
   a heartbeat encode module;
   a heartbeat decode module connected to said heartbeat encode module, a heartbeat signal being transmitted from said heartbeat encode module to said heartbeat decode module; and
   a transfer mechanism, said transfer mechanism transferring operational control for said at least one flight control surface from said first flight control sub-system to said second flight control sub-system based on a change of state in said heartbeat signal.

2. The apparatus of claim 1 wherein said first sub-system is a digital sub-system and said second sub-system is an analog sub-system.

3. The apparatus of claim 1 wherein said change of state in said heartbeat signal comprises a cessation of said heartbeat signal.

4. The apparatus of claim 1 wherein said change of state in said heartbeat signal comprises disabling at least a portion of said heartbeat signal.

5. The apparatus of claim 1 wherein said change of state in said heartbeat signal comprises a change from a first received signal to a second received signal.

6. The apparatus of claim 1 wherein said heartbeat signal comprises a plurality of independent signals.

7. The apparatus of claim 1 wherein said at least one flight control surface comprises a rudder.

8. The apparatus of claim 1 wherein said at least one flight control surface comprises an aileron.

9. The apparatus of claim 1 wherein said at least one flight control surface comprises an elevator.

10. The apparatus of claim 1 wherein said transfer mechanism transfers operational control for a plurality of flight control surfaces from said first flight control sub-system to said second flight control sub-system based on a change of state in said heartbeat signal.

11. A method comprising providing at least one flight control surface, having a first flight control sub-system connected to said at least one flight control surface, a second flight control sub-system connected to said at least one flight control surface, a heartbeat encode module, a heartbeat decode module connected to said heartbeat encode module, a heartbeat signal being transmitted from said heartbeat encode module to said heartbeat decode module; the method further comprising the steps of:
   monitoring the heartbeat signal for a change of state; and
   transferring operational control of at least said one flight control surface from said first flight control sub-system to said second flight control subsystem based on said change of state in said heartbeat signal.

12. The method of claim 11 wherein said first flight control sub-system is a digital sub-system and said second flight control sub-system is an analog sub-system.

13. The method of claim 11 wherein said change of state in said heartbeat signal comprises a cessation of said heartbeat signal.

14. The method of claim 11 wherein said change of state in said heartbeat signal comprises disabling at least a portion of said heartbeat signal.

15. The method of claim 11 wherein said change of state in said heartbeat signal comprises a change from a first received signal to a second received signal.

16. The method of claim 11 wherein said heartbeat signal comprises a plurality of independent signals.

17. The method of claim 11 wherein said at least one flight control surface comprises a rudder.

18. The method of claim 11 wherein said at least one flight control surface comprises an aileron.

19. The method of claim 11 wherein said at least one flight control surface comprises an elevator.

20. The method of claim 11 further comprising the step of transferring operational control for a plurality of flight control surfaces from said first flight control sub-system to said second flight control sub-system based on a change of state in said heartbeat signal.

21. An apparatus comprising:
   at least one flight control surface;
   an operational control transfer mechanism;
   a digital flight control sub-system connected to said at least one flight control surface and to said operational control transfer mechanism;
   an analog flight control sub-system connected to said at least one flight control surface and to said operational control transfer mechanism;
   a flight control sub-systems monitoring system, said flight control sub-systems monitoring system monitoring said digital flight control sub-system and said analog flight control sub-system;
   a heartbeat encode module;

a heartbeat decode module connected to said heartbeat encode module, a heartbeat signal being transmitted from said heartbeat encode module to said heartbeat decode module; and wherein said flight control sub-systems monitoring system disables said heartbeat signal based on a predetermined condition; and wherein said operational control transfer mechanism transfers operational control for said at least one flight control surface from said digital flight control sub-system to said analog flight control sub-system whenever said heartbeat signal is disabled.

* * * * *